United States Patent [19]

Kojima et al.

[11] Patent Number: 5,071,521
[45] Date of Patent: Dec. 10, 1991

[54] METHOD FOR MANUFACTURING A SOLID ELECTROLYTIC CAPACITOR

[75] Inventors: Toshikuni Kojima, Kawasaki; Masao Fukuyama, Yokohama; Sohji Tsuchiya, Kanagawa; Yasuo Kudoh, Yokohama, all of Japan

[73] Assignee: Matsushita Electric Industrial Co., Ltd., Osaka, Japan

[21] Appl. No.: 578,161

[22] Filed: Sep. 6, 1990

[30] Foreign Application Priority Data

Sep. 6, 1989 [JP] Japan ................................ 1-230948
Sep. 6, 1989 [JP] Japan ................................ 1-230949
Sep. 6, 1989 [JP] Japan ................................ 1-230950

[51] Int. Cl.[5] ............................ C25D 5/54; H01G 9/02
[52] U.S. Cl. ................................ 205/153; 29/25.03; 427/80; 361/525; 205/152; 205/159; 205/317
[58] Field of Search ............. 361/525; 204/38.5, 56.1; 29/25.03; 427/80

[56] References Cited

U.S. PATENT DOCUMENTS

| | | | |
|---|---|---|---|
| 4,000,046 | 12/1976 | Weaver | 204/38.5 |
| 4,148,131 | 4/1979 | Nishino et al. | 204/38.3 |
| 4,302,301 | 11/1981 | Tierman | 204/38.3 |
| 4,858,078 | 8/1989 | Morimoto et al. | 361/527 |
| 4,929,316 | 5/1990 | Harakawa et al. | 204/56.1 |
| 4,943,892 | 7/1990 | Tsuchiya et al. | 361/525 |

FOREIGN PATENT DOCUMENTS 182515 3/1989 Japan.
274020 3/1990 Japan.

Primary Examiner—John Niebling
Assistant Examiner—Kishor Mayekar
Attorney, Agent, or Firm—Lowe, Price, Leblanc & Becker

[57] ABSTRACT

A method for fabricating a solid electrolytic capacitor is described, in which a solid electrolyte is made of a conductive polymer layer and is formed on a conductive inorganic layer which is formed on a metallic foil through a dielectric film. For the formation of the conductive polymer layer, while an external electrode is not directly contacted with the conductive inorganic layer, the electrolytic polymerization reaction of a polymerizable monomer in an electrolytic solution is carried out. For this purpose, the external electrode may be covered with a conductive polymer film at the contact portion. Alternatively, the external electrode may be moved from one position to another or may be kept apart from the conductive inorganic layer during the electrolytic polymerization reaction. By this, the mechanical damages of the conductive inorganic layer with the external electrode are suppressed with good electric characteristics of the capacitor.

18 Claims, 2 Drawing Sheets

METHOD FOR MANUFACTURING A SOLID ELECTROLYTIC CAPACITOR

BACKGROUND OF THE INVENTION

1. Field of the Invention

This invention relates to a method for manufacturing a solid electrolytic capacitor wherein a conductive polymer layer is used a solid electrolyte.

2. Description of the Prior Art

In recent trends toward digitalization of circuits of electric and electronic appliances, there is a strong demand of capicaptors for the circuits which exhibit a low impedance in a high frequency range and is small in size and large in capacitance.

Known high frequency capacitors include, for example, plastic film capacitors, mica capacitors, layer-built ceramic capacitors and the like. Among them the film and mica capacitors are so large in size that a difficulty is involved in attaining a large capacitance. The layer-built ceramic capacitors have been developed in order to meet a demand for a large capacitance and a small size of the capacitors, but temperature characteristics become poor, coupled with another disadvantage that such capacitors become very expensive.

On the other hand, a certain type of capacitor is known as having a large capacitance. Such a capacitor includes, for example, an aluminium dry electrolytic capacitor and an aluminium or tantalum solid electrolytic capacitor.

With aluminium dry electrolytic capacitors, anode and cathode aluminium foils which have been etched, respectively, are convolutely wound through a paper separator and a liquid electrolyte is impregnated in the separator. This type of capacitor has the serious problem that the characteristics deteriorate due to the leakage and/or evaporation of the liquid electrolyte. To avoid this, solid electrolytes are used in the aluminium or tantalum solid electrolytic capacitors.

In the aluminium or tantalum solid electrolytic capacitor, a metallic foil such as an aluminium or tantalum foil which has been anodized to form a dielectric film or oxide film on the surface thereof is immersed in a manganese nitrate aqueous solution. Then, the manganese nitrate is thermally decomposed at a temperature of approximately 350° C., thereby forming a solid electrolyte layer made of manganese dioxide. Since the electrolyte is solid, the drawbacks, such as deterioration of characteristics involved by the effluent of the electrolyte at high temperatures or by coagulation of the electrolyte at low temperatures, can be avoided. These solid electrolytic capacitors exhibit better frequency and temperature characteristics than capacitors using liquid electrolytes. In addition, the oxide film serving as a dielectric material can be made very thin, thus being suitable for fabricating a capacitor with a large capacitance.

Aside from the above-described capacitors, there are other types of solid electrolytic capacitors including capacitors using 7,7,8,8-tetracyanoquinodimethane (TCNQ) complexes instead of the manganese dioxide layer and capacitors using, as the solid electrolyte, a conductive polymer layer formed by electrolytic polymerization of polymerizable monomers such as pyrrole, furan and the like.

The solid electrolytic capacitors using the manganese dioxide layer as the solid electrolyte are disadvantageous in that the dielectric film will be damaged during plural cycles of thermal decomposition treatments. Additionally, the specific resistance of the manganese dioxide layer is so high that the lost (tan δ) in a high frequency range is not satisfactory.

The capacitors using the organic semiconductors such as TCNQ complexes have the problem that the specific resistance is increased at the time of application of the organic semiconductor and that the adhesion of the semiconductor to anodized metallic foil is not so high. Thus, such capacitors are not satisfactory with respect to characteristic properties.

On the other hand, with the capacitors using, as the solid electrolyte layer, an electrolytically polymerized conductive layer, the polymer layer is formed by the electrolytic polymerization reaction. Since the electrolytic polymerization reaction proceeds through an electrolytic oxidation reaction of monomers, it is very difficult to form the polymer layer on a metal surface which is insulated with a dielectric film. It may be possible to form the electrolytically polymerized conductive layer prior to the formation of the dielectric film. This will involve a change in quality of the electrolytically polymerized film and a relatively poor adhesion between the polymer film and a metallic film. Thus, it is not of practical utility.

We have proposed in U.S. Pat. No. 4,943,892 that a metallic foil having a dielectric film is formed with a manganese dioxide layer on the film and a conductive polymer layer is formed on the manganese dioxide layer by electrolytic polymerization of a polymerizable compound by contact of an anode electrode with the manganese dioxide layer from outside. The resultant solid electrolytic capacitor has a solid electrolyte layer made of the manganese dioxide layer and the conductive polymer layer.

This solid electrolytic capacitor has good frequency, temperature and life characteristics but is not satisfactory with respect to breakdown voltage. The reason for this is considered as follows.

For the formation of a conductive polymer layer for a solid electrolyte by electrolytic polymerization, when the metallic foil having a dielectric film is used as an electrode, little current is passed, so that the polymerization reaction scarcely proceeds. Accordingly, an electrode for an anode (i.e. an electrode for polymerization reaction) is in contact with the surface of the manganese dioxide layer, to which a potential is applied. The portion at which the electrode has been contacted is apt to be produced with mechanical defects owing to the contact of the electrode, causing dielectric breakdown to occur. Thus, a satisfactory breakdown voltage is not achieved. In addition, the portion at which the electrode has been contacted is liable to be formed with a conductive polymer layer which is smaller in thickness than the other portions. This is considered to be another factor for lowering the breakdown voltage.

Moreover, when the conductive polymer layer is formed on the conductive manganese dioxide layer formed on the dielectric film through the electrode for the polymerization reaction, the potential of the metallic foil isolated with the dielectric film becomes negative, causing the dielectric film to be dissolved out and damaged. This leads to a substantial amount of leakage current with a poor breakdown voltage characteristic.

SUMMARY OF THE INVENTION

It is therefore an object of the present invention to provide an improved method for fabricating a solid electrolytic capacitor wherein an electrolytic polymerization reaction is carried out while an external electrode is not directly contacted with an inorganic layer formed on a metallic foil through a dielectric film whereby a uniform conductive polymer film is formed on the conductive inorganic layer of the metallic foil and thus, the resulting capacitor has a reduced degree of leakage current and a good breakdown voltage characteristic.

It is another object of the invention to provide an improved method for fabricating a solid electrolytic capacitor by electrolytic polymerization which is carried out while keeping a metallic foil having a conductive inorganic layer through a dielectric film and an external electrode for the electrolytic polymerization at the same potential whereby the dielectric film is not damaged during the electrolytic polymerization with improved leakage current and breakdown voltage characteristics.

The above objects of the invention can be achieved, according to the invention, a method for fabricating a solid electrolytic capacitor of the type which comprises a metallic foil capable of forming a dielectric oxide film thereon, a dielectric oxide film formed on the metallic foil, a conductive inorganic layer formed on the dielectric oxide film, a conductive polymer layer formed on the conductive inorganic layer by electrolytic polymerization, and terminals formed on the metallic foil and the conductive polymer film, respectively, the method comprising:

providing a metallic foil having a dielectric film and a conductive inogranic layer formed thereon in this order;

and subjecting the metallic foil to electrolytic polymerization of a polymerizable compound in an electrolytic solution by application of a polymerization potential between an external electrode and a counter electrode placed in the electrolytic solution without direct contact of the external electrode with the conductive inorganic layer whereby a conductive polymer layer serving as a solid electrolyte is uniformly formed on the conductive inorganic layer.

For the indirect contact of the external electrode with the conductive inorganic layer during the electrolytic polymerization, the external electrode may be covered with a conductive polymer film. Alternatively, the external electrode may be contacted while changing the contact point from one position to another during the electrolytic polymerization, or may be kept apart from the conductive inorganic layer at a distance sufficient to cause an electrolytically polymerized layer to grow from the external electrode to the conductive inorganic layer. In these cases, the external electrode may be or may not be covered with the conductive polymer film prior to the electrolytic polymerization.

Preferably, during the electrolytic polymerization, the metallic foil is kept at the same potential as the external electrode used for the electrolytic polymerization. Moreover, it is also preferred that the electrolytic polymerization is effected by two stages. In the first stage, an electrolyte which is difficult to be de-doped in an environment where the capacitor is employed is used. In the second stage, an electrolyte used should preferably be readily de-doped for repairing purposes. In the second stage, an anode of the capacitor is preferably used as the electrode for the electrolytic polymerization.

DETAILED DESCRIPTION AND EMBODIMENTS OF THE INVENTION

Figure 1:
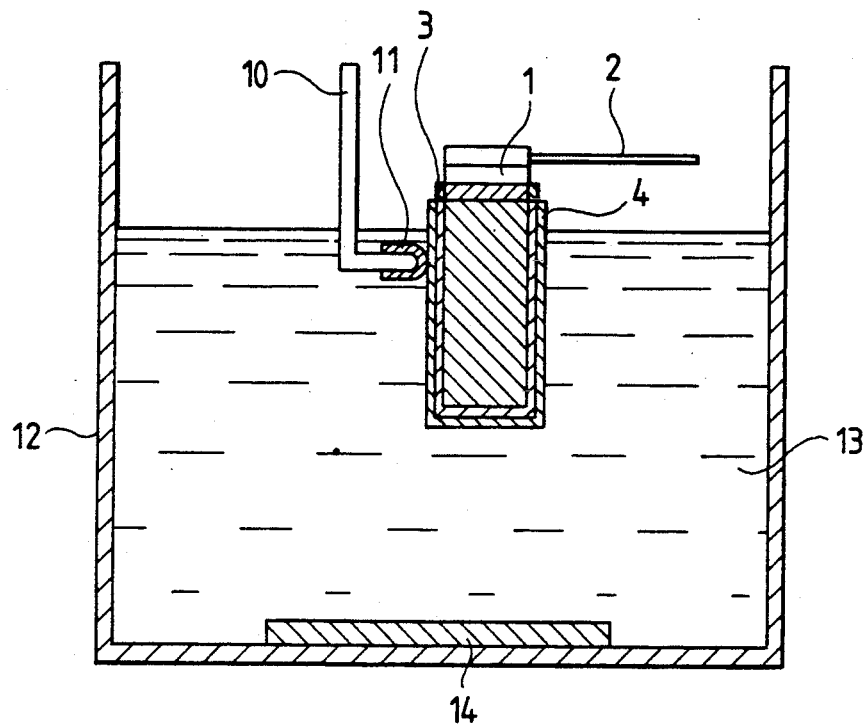
FIG. 1 is a schematic view illustrating the formation of a conductive polymer layer according to one embodiment of the invention.

Reference is now made to the accompanying drawings wherein like reference numerals indicate like parts or members.

As shown in FIG. 1, a metal foil 1, such as an aluminium foil, a tantalum foil, a titanium foil or a foil of an alloy of these metals, having a positive lead electrode 2 for a capacitor is first provided. This foil 1 is subjected to etching by any known procedures to increase the surface area. The etched foil is subsequently anodized by immersion in an aqueous acid solution to form an dielectric oxide film 3 on the surface of the foil 1 as shown. The anodization is effected by an ordinary electrochemical procedure. The acid used for this purpose may be an inorganic acid such as phosphoric acid or an organic acid such as oxalic acid, adipic acid or the like. If the metallic foil is made of aluminium, $Al_2O_3$ is formed on the foil surface. Alternatively, if tantalum is used, $Ta_2O_5$ is formed as the dielectric oxide film 3. The foil 1 on which the anodized film 3 has been formed is immersed in an aqueous solution of, for example, a water-soluble manganese compound for a given time and dried in air at 200° to 300° C. thereby thermally decomposing the nitrate into manganese dioxide to form a conductive inorganic layer 4 on the anodized film 3. The conductive inorganic layer 4 in this case is manganese dioxide. Examples of the water-soluble manganese compound include manganese nitrate, and salts of manganese and acetyl acetone, oleic acid, naphthenic acid and the like. Of these, manganese nitrate is preferred because of its availability.

The resultant metallic foil is immersed in an electrolytic polymerization solution 13 placed in a vessel 12 for electrolytic polymerization so that an external electrode 10 (i.e. an auxiliary electrode for electrolytic polymerization) covered with a conductive polymer film 11 is in contact with the conductive inorganic layer 4 at the film 11 as shown. The external electrode 10 is made of a metal such as Pt, Ni, stainless steps or the like. The conductive polymer film 11 has a thickness of from 0.001 to 1 mm. In this case, the conductive polymer film 11 is in direct contact with the conductive inorganic layer 4. The conductive polymer film 11 may be formed by immersing an electrode substrate in an electrolytic solution comprising a polymerizable monomer such as pyrrole and applying a potential to the electrode substrate. The electrolytic solution used to form the conductive polymer film 11 has preferably the same composition as a conductive polymer film 5 described later.

Figure 2:
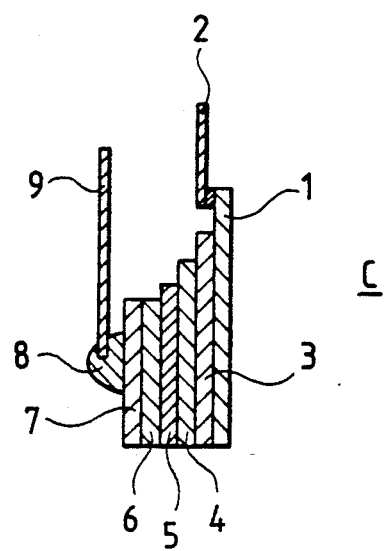
FIG. 2 is a schematic sectional view of a solid electrolytic capacitor obtained according to the method of the invention.

At the bottom of the vessel 12 is provided a counter electrode or cathode 14 for the electrolytic polymerization. The external electrode 10 and the counter electrode 14 are connected through a suitable power supply (not shown). In this arrangement, when a potential which is higher than a potential for polymerization is applied between the external electrode 10 and the counter electrode 14, a conductive polymer film 5 is formed on the conductive inorganic layer 4 as shown in FIG. 2. Although the formation of the conductive polymer film 5 depends on the potential, the electrolytic polymerization is ordinarily continued for 10 minutes to 1.5 hours. By this, the conductive polymer film having a thickness of from 5 to 30 micrometers is formed.

Thereafter, a graphite paste layer 6 and a silver paste layer 7 are formed as shown in FIG. 2, followed by attaching a cathode lead 9 with a solder 8 to obtain a solid electrolytic capacitor C.

In the above procedure, the external electrode 10 is not necessarily covered entirely with the conductive polymer film 11 but may be covered on a portion around which it contacts the conductive inorganic layer 4. The conductive polymer film 11 used to cover the external electrode 10 may be made of conductive polymers formed by the electrolytic polymerization. Preferably, the conductive polymer film 11 should has the same composition as the conductive polymer film 5 used as a solid electrolyte.

The electrolytic polymerization solution 13 placed in the vessel 12 consists of an electrolytically polymerizable monomer and a support electrolyte in a solvent. The monomer and the electrolyte are usually dissolved in water or an organic solvent in amounts of 0.1 to 1 moles/liter and from 0.01 to 0.5 moles/liter, respectively.

The solvent may be any inert compounds capable of dissolving both the monomer and electrolyte. Examples of such solvents include water and non-aqueous polar solvents such as acetonitrile, propylene carbonate, $\gamma$-butyrolactone, dimethylformamide and the like.

Examples of the monomers include pyrrole or its derivatives having a substituent, a dimer or trimer of pyrrole, thiophene or its derivatives having a substituent, a dimer of thiophene or bithiophene, or a trimer of thiophene or terthienyl, and the like. Examples of the substituent for both pyrrole and thiophene derivatives include a lower alkyl group such as methyl, a lower alkoxy group such as methoxy, ethoxy or the like, an aryl group such as phenyl, and the like.

The support electrolytes may be any known support electrolytes and include, for example, inorganic compounds of anions such as $ClO_4^-$, $BF_4^-$ or $PF_6^-$ and cations of ammonium, an alkali metal or the like, organic compounds such as aliphatic acids including formic acid, oxalic acid and the like and salts thereof, aromatic carboxylic acids and salts such as salicylic acid, benzoic acid and their salts, organic sulfonic acids such as toluenesulfonic acid, naphthalenesulfonic acid and their salts as is known in the art.

As a matter of course, the monomers and the support electrolytes may, respectively, be used in combination. Additives ordinarily used in the art may be added to the electrolytic polymerization solution. Especially, in order to improve adhesion of the conductive polymer layer to the conductive inorganic layer 4 and/or the graphite layer 6, polymers such as polyhydroxystyrene, novolac resins, polyacrylic acid, polymethacrylic acid and copolymers of monomers of these polymers mentioned above may be added to the solution 13. In this case, the polymer should preferably be added at a concentration of 0.1 to 2 wt % based on the solution.

The solid electrolytic capacitor obtained according to the method of the invention has the conductive polymer layer in combination with the conductive inorganic layer such as, for example, a manganese dioxide layer, as a solid electrolyte so that the capacitor has good frequency, temperature and life characteristics.

Since the conductive polymer film 11, not a metal as in prior art, is directly contacted with the conductive inorganic layer during the electrolytic polymerization, mechanical damages as will be caused by the contact of the external electrode can be suppressed. As a result, the dielectric breakdown involved by the mechanical damages is suppressed, with an improved breakdown voltage characteristic.

In the above embodiment, the conductive polymer film 11 is contacted with the conductive inorganic layer 4. Thus, the external electrode 10 is not directly contacted with the layer 4. The electrolytic polymerization may be effected in such a way that the electrode 10 with or without being covered with the conductive polymer film 11 is kept apart from the conductive inorganic layer 4 at a distance sufficient to cause a conductive polymer film to grow to the conductive inorganic layer 4. In this state, when the electrolytic polymerization starts, an electrolytically polymerized product is initially formed on the external electrode and grows therefrom toward the inorganic conductive layer 4, thereby forming the film 5. The external electrode 10 in this case may be or may not be covered with the conductive polymer film 11 since a similar film is formed at the initial stage of the electrolytic polymerization. More particularly, it is important in the practice of the invention the external electrode be not in direct contact with the conductive inorganic layer. When the external electrode is kept apart from the conductive inorganic layer at the initial stage of the electrolytic polymerization, the distance between the external electrode and the conductive inorganic layer is conveniently not larger than 1 mm.

Figure 3:
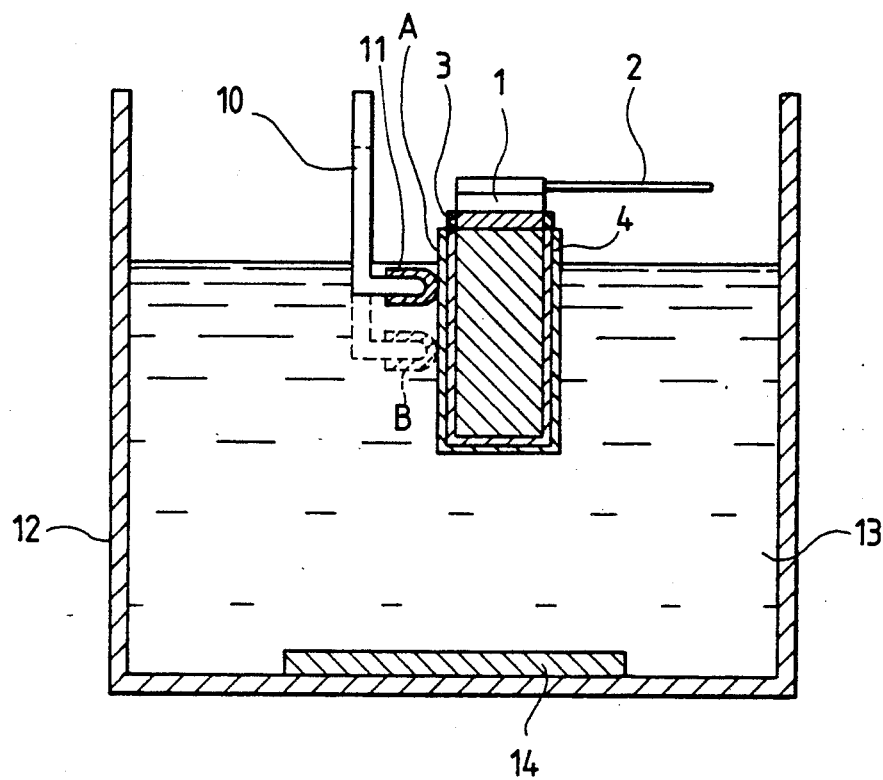
FIG. 3 is a schematic view illustrating the formation of a conductive polymer layer according to another embodiment of the invention.

Alternatively, the external electrode with or without being covered with the conductive polymer film 11 may be moved from an initial contact point A to another point B, as shown in FIG. 3, at least once during the electrolytic polymerization. By this, the point A at which a formed polymer layer becomes thinner than at other portions due to the contact is exposed when the point is changed from A to B. A further continuation of the electrolytic polymerization permits a conductive polymer layer to be formed at the initial point A, thereby giving the conductive polymer with a uniform thickness throughout the layer. Only a slight movement of at least 1 mm is sufficient for this purpose.

If the electrode 10 is moved during the electrolytic polymerization as shown in FIG. 3, the conductive polymer film 11 provided at the tip of the anode electrode may not necessarily be formed.

The electrolytic polymerization should preferably be carried out while keeping the metallic foil 1 and the external electrode 10 at the same potential. By this, the potential of the metallic foil is not rendered negative, not causing the dielectric film 3 to be dissolved out. In this case, since the metallic foil 1 is applied with a positive potential, the chemical conversion proceeds during the electrolytic polymerization reaction to repair damaged portions, if present. Accordingly, the electrolytically polymerized conductive layer 5 is formed in a state where the dielectric film 3 is not damaged. The resultant solid electrolyte has a reduced degree of leakage current and a good breakdown voltage characteristic.

According to the method of the invention, the conductive polymer layer 5 is formed on the conductive inorganic layer 4, which ensures the layer 5 of good quality, resulting in good frequency and internal loss (tan δ) characteristics of the resultant capacitor.

Another embodiment of the invention is described. In this embodiment, the electrolytic polymerization is performed by two stages.

In the first stage, the conductive inorganic layer-bearing metallic foil 1 having the lead electrode 2 is immersed in the vessel 12 as shown in FIGS. 1 and 3. The external electrode 10 with or without the conductive polymer film 11 is contacted with the conductive inorganic layer 4 in the polymerization solution 13 comprising a polymerizable compound or monomer, a support electrolyte and a solvent such as water as in the first embodiment. The counter electrode or cathode 14 is provided as shown in FIGS. 1 and 3.

In this state, a potential which is higher than a polymerization potential is applied to the external electrode 10 and the counter electrode 14, thereby allowing the conductive polymer layer 5 to be grown on the conductive inorganic layer 4 such as a manganese dioxide layer. When the layer 4 is completely covered with the conductive polymer layer 5, the electrolytic polymerization reaction is stopped.

It will be noted that the polymerizable monomers used may be those defined in the first embodiment and that in the conductive polymer layer, the anion is contained as a dopant at a concentration of from 25 mole % to 32 mole %.

The conductive polymer layer 5 should be stable. The conductive polymer layer 5 is formed of a polymer of a monomer used and an anion as a dopant. For the stability, it is important that the anion be unlikely to be de-doped in an environment where the capacitor is employed. It has been found that when a naphthalenesulfonate or alkylnaphthalenesulfonate is used as the anion of the support electrolyte, the anion is not readily de-doped from the conductive polymer layer. For instance, the conductive polymer layer is washed with water or an alcohol on the surface thereof and dried. The lead 9 of a cathode of the capacitor is attached with use of a carbon paste 6 and a silver paste 7. The resultant capacitor C is covered with an epoxy resin. Subsequently, the capacitor is aged at a potential of about 1.3 times a rated voltage, after which it is subjected to measurement of leakage current and breakdown voltage characteristics. As a result, it has been found that these characteristics are scattered to an extent.

Although the aging is effected in a humid condition, the leakage current and breakdown voltage characteristics are slightly improved, but not significantly.

Then, after the formation of the conductive polymer in the first stage using the naphthalenesulfonate or alkylnapthalenesulfonate as an anion of the support electrolyte, the electrolytic polymerization is further conducted in a second stage using a support electrolyte whose anion is likely to be de-doped and which has repairing properties by itself. The leakage current and breakdown voltage characteristics have been found to be remarkably improved.

In this second stage electrolytic polymerization, the use of the lead 2 for the anode 1 of the capacitor instead of the external electrode 10 is more effective for the electrolytic polymerization. The support electrolyte used in this stage is alkyl phosphates such as methyl phosphate, ethyl phosphate, propyl phosphate, butyl phosphate and the like, mono and di-carboxylic acids such as acetic acid, propionic acid, adipic acid, benzoic acid, salicyclic acid and the like. These electrolytes may be used singly or in combination. The electrolytes used in this stage is likely to be de-doped and have repairing ability for the dielectric film 3 on the metallic foil.

The polymerizable monomers may be those defined in the first embodiment. In view of the safety and productivity, pyrrole, thiophene and derivatives thereof are used. The solvent for the polymerization solution is usually water although a non-aqueous solvent may be contained when an electrolyte used is sparingly soluble in water.

In this embodiment, the polymerization solution 13 may contain polymers such as polyhydroxystyrene, novolac resins, polyacrylic acid, polymethacrylic acid or copolymers of monomers for these polymers in order to improve adhesion between the conductive inorganic layer 4 and the conductive polymer layer 5 or the conductive polymer layer 5 and the graphite layer 6.

The electrolytic polymerization should preferably be carried out while keeping the metallic foil 1 at the same potential as the anode electrode 10 in the first stage. By this, the potential of the metallic foil is not rendered negative, not causing the dielectric film 3 to be dissolved out. Further, the metallic foil 1 is applied with a positive potential, so that the chemical conversion proceeds during the electrolytic polymerization reaction to repair damaged portions. Accordingly, the electrolytically polymerized conductive layer 5 is formed in a state where the dielectric film 3 is not damaged.

It is preferred that the formation of the conductive polymer film 5 in the first stage is effected using the external electrode 10 as shown in FIGS. 1 and 3 and that the electrolytic polymerization in the second stage is effected using the anode 2 of the capacitor as an anode for the polymerization reaction. It is also preferred that the solvent for the polymerization solution in both stages is water.

In the first stage, it is preferred that the external electrode is covered with a conductive polymer at least around a contact portion. Alternatively, the contact portion with the anodized foil may be changed to another portion during the electrolytic polymerization. However, this is not essential because the electrolytic polymerization is effected by two stages. More particularly, even if the conductive polymer layer is formed thinner at the contact portion in the first stage, this is remedied by the second stage electrolytic polymerization.

As stated above, the electrolytic polymerization reaction in this embodiment is effected by two stages. In the first stage, an electrolyte which in unlikely to be de-doped is used. In the second stage, an electrolyte which is likely to be de-doped and has high repairing ability. As a result, the dielectric film 3 of the metallic foil 2 is reduced in number of defects and weak portions, thus leading to an improvement of the leakage current and breakdown voltage.

The present invention is more particularly described by way of examples.

EXAMPLE 1

A 8 mm long×10 mm wide aluminium etched foil was anodized with a 3% ammonium adipate aqueous solution under conditions of a temperature of about 70°

C., a time of 40 minutes and a potential of 70 volts, thereby forming a dielectric film on the etched foil surface. The anodized aluminium foil was applied with an aqueous manganese nitrate solution and then subjected to thermal decomposition treatment at 200° C. for 30 minutes, thereby forming a manganese oxide layer (i.e. a conductive layer) on the dielectric film.

On the other hand, a stainless steel electrode substrate was dipped at the tip thereof in an electrolytic solution comprising 0.5 moles/liter of pyrrole, 0.15 moles/liter of monoisopropyl naphthalenesulfonate and water, followed by application of a potential of 3 volts for 30 seconds. As a consequence, a conductive polymer film made primarily of a pyrrole polymer was deposited on the dipped portion of the substrate to obtain an anode electrode.

The manganese dioxide-bearing aluminium foil was immersed in the electrolytic solution used above and the covered external electrode was contacted at the covered tip portion with the surface of the aluminium foil. A potential of 3 volts was applied between the external electrode and a counter electrode placed in the electrolytic solution for 40 minutes. By this, a conductive polymer layer serving as a solid electrolyte was formed on the manganese oxide layer, followed by washing with water and then with ethanol and drying. Thereafter, a carbon paste and a silver paste were applied on the conductive polymer layer, followed by soldering a cathode lead as shown in FIG. 2, thereby obtaining a solid electrolytic capacitor.

The above procedure was repeated to obtain ten solid electrolytic capacitors in total. These capacitors were subjected to measurement of breakdown voltage, with the result that an average breakdown voltage was 37.81 volts.

For comparison, the above procedure was repeated except that the stainless steel electrode substrate was not formed with the conductive polymer film on the surface thereof, thereby obtaining ten solid electrolytic capacitors.

The capacitors were likewise subjected to measurement of breakdown voltage, with the result that an average voltage was 28.34 volts, which was significantly lower than that of Example 1.

Moreover, the capacitors of Example 1 were aged at 20 volts for 1 hour to measure an initial capacitance, an internal loss at 120 Hz, and an impedance at 1 MHz. The results are shown below.
(1) Initial capacitance (120 Hz) = 5.00 $\mu$F
(2) Internal loss (120 Hz) = 2.3%
(3) Impedance (1 MHz) = 13 m$\Omega$

EXAMPLE 2

The general procedure of Example 1 was repeated except that the stainless steel electrode substrate was not covered with the conductive polymer film and that after the electrolytic polymerization reaction was carried out for 10 minutes, the electrode was moved downwardly by 5 mm from the initial contact point, followed by further polymerization reaction for 10 minutes, thereby obtaining ten solid electrolytic capacitors.

These capacitors were subjected to measurement of breakdown voltage, with an average value of 35.41 volts.

For comparison, the procedure of Example 2 was repeated except that the electrode was not moved, thereby obtaining ten solid electrolytic capacitors. The measurement of breakdown voltage revealed that an average breakdown voltage was 28.34 volts which was significantly lower than that of Example 2.

The capacitors of Example 2 were aged at 20 volts for 1 hour to measure an initial capacitance, an internal loss at 120 Hz, and an impedance at 1 MHz. The results are shown below.
(1) Initial capacitance (120 Hz) = 5.28 $\mu$F
(2) Internal loss (120 Hz) = 2.4%
(3) Impedance (1 MHz) = 12 m$\Omega$

EXAMPLE 3

The general procedure of Example 1 was repeated except that after the electrolytic polymerization reaction was carried out for 10 minutes, the electrode was moved downwardly by 5 mm from the initial contact point, followed by further polymerization reaction for 10 minutes, thereby obtaining ten solid electrolytic capacitors.

These capacitors were subjected to measurement of breakdown voltage, with an average value of 38.26 volts. The standard deviation of these values was smaller than those of Examples 1 and 2, and thus the solid electrolytic capacitors were uniform in the characteristic.

The capacitors were aged at 20 volts for 1 hour to measure an initial capacitance, an internal loss at 120 Hz, and an impedance at 1 MHz. The results are shown below.
(1) Initial capacitance (120 Hz) = 5.33 $\mu$F
(2) Internal loss (120 Hz) = 2.4%
(3) Impedance (1 MHz) = 12 m$\Omega$

EXAMPLE 4

The general procedure of Example 1 was repeated except that the stainless steel electrode substrate was immersed in an electrolytic solution consisting of 0.5 moles/liter of pyrrole, 0.15 moles/liter of monoisopropyl naphthalenesulfonate and water, and applied with a potential of 3 volts for 10 seconds, thereby obtaining ten solid electrolytic capacitors.

These capacitors were subjected to measurement of breakdown voltage, with an average value of 35.26 volts.

The capacitors were aged at 20 volts for 1 hour to measure an initial capacitance, an internal loss at 120 Hz, and an impedance at 1 MHz. The results are shown below.
(1) Initial capacitance (120 Hz) = 5.11 $\mu$F
(2) Internal loss (120 Hz) = 2.3%
(3) Impedance (1 MHz) = 12 m$\Omega$

EXAMPLE 5

The general procedure of Example 1 was repeated except that the stainless steel electrode substrate was immersed in an electrolytic solution consisting of 0.5 moles/liter of pyrrole, 0.15 moles/liter of monoisopropyl naphthalenesulfonate and water and applied with a potential of 3 volts for 60 seconds, thereby obtaining ten solid electrolytic capacitors.

These capacitors were subjected to measurement of breakdown voltage, with an average value of 39.77 volts.

The capacitors were aged at 20 volts for 1 hour to measure an initial capacitance, an internal loss at 120 Hz, and an impedance at 1 MHz. The results are shown below.
(1) Initial capacitance (120 Hz) = 5.27 $\mu$F
(2) Internal loss (120 Hz) = 2.2%

(3) Impedance (1 Mhz) = 13 mΩ

EXAMPLE 6

The general procedure of Example 1 was repeated except that there was used a 12 mm long×15 mm wide tantalum foil which was etched with a tetraammonium p-toluenesulfonate aqueous solution and anodized with a 10% phosphoric acid aqueous solution under conditions of 90° C. and 67 volts to form a dielectric film on the surface thereof, thereby obtaining ten solid electrolytic capacitors.

These capacitors were subjected to measurement of breakdown voltage, with an average value of 28.6 volts.

For comparison, the procedure of Example 6 was repeated except that the electrode was not covered with any conductive polymer film on the surface thereof, thereby obtaining ten solid electrolytic capacitors. The measurement of breakdown voltage revealed that an average breakdown voltage was 22.3 volts which was significantly lower than that of Example 6.

The capacitors were aged at 20 volts for 1 hour to measure an initial capacitance, an internal loss at 120 Hz, and an impedance at 1 MHz. The results are shown below.

(1) Initial capacitance (120 Hz) = 9.87 μF
(2) Internal loss (120 Hz) = 2.4%
(3) Impedance (1 Mhz) = 56 mΩ

As will be apparent from the results of Examples 1 and 6, the formation of the conductive polymer film on the anode electrode brings about an improvement of the breakdown voltage characteristic. The comparison of the results of Examples 1, 4 and 5 reveals that the formation of the conductive polymer film leads to an improvement of the breakdown voltage. Moreover, the results of Examples 2 and 3 reveal that the movement of the anode electrode with respect to the contact portion during the electrolytic polymerization give better results on the breakdown voltage.

The solid electrolytic capacitors obtained in the examples have good electric characteristics as will be appreciated from the results of the example. Besides, the capacitors were found to exhibit a good capacitance in relation to the variation in time and a small LC value with good characteristic properties including the capacitance when the temperature was changed.

EXAMPLE 7

A 7 mm long×10 mm wide aluminium etched foil attached with an anode lead by caulking was anodized with use of a 3% ammonium adipate aqueous solution under conditions of about 70° C. and 70 volts, thereby forming a dielectric film on the etched surface of the foil. Thereafter, the foil was immersed in a 30% manganese nitrate aqueous solution and naturally dried, followed by thermal decomposition at 250° C. for 30 minutes to deposit manganese dioxide, thereby forming a conductive layer on the dielectric film. Subsequently, the foil was placed in an electrolytic solution consisting of 0.5 moles/liter of pyrrole, 0.1 mole/liter of sodium triisopropylnaphthalenesulfonate and water. An external electrode for electrolytic polymerization having a polypyrrole covered thereon was contacted with the conductive layer of the foil. A DC voltage of 3 volts was applied for electrolytic polymerization between the external electrode and a counter electrode placed in the solution while applying the potential simultaneously to the anode lead, thereby forming a conductive polypyrrole layer on the conductive layer.

After the formation of the solid electrolyte layer, the foil was washed with water and dried, followed by application of a carbon paste and a silver paste on the solid electrolyte layer and attaching a cathode lead, thereby obtaining a solid electrolytic capacitor.

The above procedure was repeated to obtain ten solid electrolytic capacitors in total.

These capacitors were aged at 20 volts for 1 hour and subjected to measurement of an initial capacitance at 120 Hz, a leakage current 2 minutes after commencement of application of a potential of 16 volts, and a breakdown voltage. The average value of the ten measurement was as follows.

Initial capacitance (120 Hz) = 5.3 μF
Leakage current = 0.11 μA
Breakdown voltage = 40.5 volts For comparison, the above procedure was repeated except that any potential was applied to the anode lead during the electrolytic polymerization, thereby obtaining ten solid electrolytic capacitors.

The results of the measurement of the respective characteristics are indicated below.

Initial capacitance (120 Hz) = 5.2 μF
Leakage current = 2.3 μA
Breakdown voltage = 35.2 volts The leakage current and the breakdown voltage are improved over the case where no potential is applied to the anode lead.

EXAMPLE 8

The general procedure of Example 7 was repeated except that n-butyl phosphate was used instead of sodium triisopropylnaphthalenesulfonate, thereby obtaining ten solid electrolytic capacitors. As a results, it was found that the better leakage current and breakdown voltage characteristics were obtained when the potential was applied both the anode lead and the electrode for the electrolytic polymerization.

EXAMPLE 9

The general procedure of Example 7 was repeated except that there was used, instead of the anodized aluminium etched film, a 8 mm long×10 mm wide tantalum foil which had been anodized, after embossing, with a 10% phosphoric acid aqueous solution at 90° C., thereby forming a dielectric film on the surface thereof, thereby obtaining ten solid electrolytic capacitors. The results of the measurement of the respective characteristics revealed that the solid electrolytic capacitors obtained by applying the potential to both anode lead and external electrode for the polymerization reaction were better with respect to the leakage current and the breakdown voltage.

EXAMPLE 10

A commercially available, etched and anodized Al foil (a rated voltage of 16 volts, 10 μF) was provided. This foil was immersed in a manganese nitrate aqueous solution and thermally decomposed to form a manganese dioxide layer on the anodized foil.

A monomer for electrolytic polymerization reaction used was pyrrole and a solvent used was water.

An electrolyte used in a first stage of the electrolytic polymerization was sodium triisopropylnaphthalenesulfonate and an electrolyte for a second state was n-butyl phosphate. The monomer was used in an amount of 0.5 moles/liter and the electrolyte was used in an amount of 0.1 mole/liter in each stage.

The electrolytic polymerization in the first stage was carried out by applying a DC voltage of 3 volts between an external electrode and a cathode placed at the bottom of a vessel for 15 minutes. Subsequently, the electrolytic polymerization in the second stage was effected by application of 2 volts to an anode lead of the foil and the cathode for 10 minutes. Thereafter, the resultant foil was washed with pure water and dried, followed by application of a carbon paste and a silver paste and attachment of a cathode lead as shown in FIGS. 1 and 3. The resultant capacitor was covered with an epoxy resin and aged at 16 volts.

Ten solid electrolytic capacitors were subjected to measurement of a capacitance and an internal loss (tan δ), with the following results.

|  | Capacitance | tan δ |
|---|---|---|
| 120 Hz | 9.0 μF | 1.2% |
| 1 kHz | 8.5 | 2.8 |

The leakage current of these capacitors was measured 2 minutes after application of 16 volts, with the result that all the values were not larger than 1 μA. The breakdown voltage was in the range of 23 to 26 volts.

When a conductive polymer film of the second stage was not formed, 20 to 30% of the capacitors obtained were in short-circuited state, and some capacitors, not short-circuited, were broken down at 16 volts or below.

Similar results were obtained when using mono, di or tri-substituted alkylnaphthalenesulfonates such as of methyl, ethyl or butyl or naphthalenesulfonates as an electrolyte in the first stage and mono and di-carboxylic acids such as acetic acid, propionic acid and adipic acid, benzoic acid and salicyclic acid in the second stage.

The second stage electrolytic polymerization is more effective when the service voltage of the capacitor is higher, e.g. 25 or 35 volts. The yield of the capacitors for a service voltage of 35 volts was not large than 50% when the second stage electrolytic polymerization was not effected. This was increased to 80% or more when the second stage polymerization was carried out.

Moreover, when polyhydroxystyrene was added to the polymerization solution and the resultant capacitors were subjected to a high temperature standing test at 105° C., the lowerings of the characteristics such as a leakage current and a breakdown voltage were prevented and the capacitance and the internal loss were prevented from lowering. When the high temperature standing test was effected at 105° C. for 1000 hours, not less than 20% of the capacitors obtained without performing the second stage electrolytic polymerization were abruptly lowers in the leakage current and breakdown voltage. The second stage electrolytic polymerization and the addition of the polymer to the polymerization solution resulted in not larger than 10% of capacitors suffering the abrupt lowering.

As will be apparent from Example 10, the two stage polymerization is effective in improving the high frequency characteristic, leakage current and breakdown voltage.

What is claimed is:

1. A method for fabricating a solid electrolytic capacitor of the type which comprises a metallic foil capable of forming a dielectric oxide film thereon, a dielectric oxide film formed on the metallic foil, an conductive inorganic layer formed on the dielectric oxide film, a conductive polymer layer formed on the conductive inorganic layer by electrolytic polymerization, and terminals formed on the metallic foil and the conductive polymer layer, respectively, the method comprising:

providing a metallic foil having a dielectric film and a conductive inorganic layer formed thereon in this order;

and subjecting the metallic foil to electrolytic polymerization of a polymerizable compound in an electrolytic solution by application of a polymerization potential between an external electrode and a counter electrode placed in the electrolytic solution without direct contact of the external electrode with the conductive inorganic layer whereby a conductive polymer layer serving as a solid electrolyte is uniformly formed on the conductive inorganic layer.

2. A method according to claim 1, wherein the external electrode is covered with a conductive polymer film and the conductive film is contacted with the conductive inorganic layer during the electrolytic polymerization.

3. A method according to claim 1, wherein the external electrode is kept apart from the conductive inorganic layer at a distance sufficient to cause a conductive polymer to grow from the external electrode toward the conductive inorganic layer.

4. A method according to claim 3, wherein the distance is not larger than 1 mm.

5. A method according to claim 3, wherein said external electrode is covered with a conductive polymer film.

6. A method according to claim 1, wherein the contact between the external electrode and the conductive inorganic layer is at least once changed from one position to another position of the conductive inorganic layer during the electrolytic polymerization.

7. A method according to claim 1, wherein the electrolytic polymerization is effected while keeping the metallic foil and the external electrode at the same potential.

8. A method according to claim 1, wherein the conductive polymer film of said external electrode is formed by electrolytic polymerization.

9. A method according to claim 1, wherein the conductive polymer film of said external electrode has the same composition as the conductive polymer film formed on the conductive inorganic layer.

10. A method according to claim 1, wherein said electrolytic solution comprises at least one selected from the group consisting of pyrrole, thiophene and derivatives thereof and a support electrolyte.

11. A method according to claim 1, wherein said electrolytic solution further comprises an additive polymer selected from the group consisting of polyhydroxystyrene, novolac resins, polyacrylic acid, polymethacrylic acid and copolymers of monomers for the polymers defined above.

12. A method according to claim 1, wherein said metallic foil is made of a member selected from the group consisting of aluminium, tantalum, titanium and alloys thereof.

13. A method according to claim 1, wherein said conductive inorganic layer is made of manganese oxide.

14. A method for fabricating a solid electrolytic capacitor of the type which comprises a metallic foil capable of forming a dielectric oxide film thereon, a dielectric oxide film formed on the metallic foil, a conductive inorganic layer formed on the dielectric oxide film, a conductive polymer layer formed on the conductive inorganic layer by electrolytic polymerization, and terminals formed on the metallic foil and the conductive polymer layer, respectively, the method comprising:

providing a metallic foil having a dielectric film and a conductive inorganic layer formed thereon in this order;

and subjecting the metallic foil to electrolytic polymerization of a polymerizable compound in an electrolytic solution by application of a polymerization potential between an external electrode and a counter electrode placed in the electrolytic solution without direct contact of the external electrode with the conductive inorganic layer whereby a conductive polymer layer serving as a solid electrolyte is uniformly formed on the conductive inorganic layer in which the electrolytic polymerization is effective by two stages wherein an electrolytic polymerization solution of a first stage comprises a support electrolyte selected from the group consisting of naphthalenesulfonates and mono, di, and tri-alkylnapthalenesulfonates and an electrolytic polymerization solution of a second stage comprises a support electrolyte selected from the group consisting of alkyl phosphates, mono and di-carboxylic acids and salts thereof whereby two conductive polymer films are formed on the conductive inorganic layer.

15. A method according to claim 14, wherein the electrolytic polymerization solutions in the first and second stages each comprises a monomer selected from the group consisting of pyrrole, thiophene and derivatives thereof.

16. A method according to claim 14, wherein the electrolytic polymerization solution in the first or second stage further comprises an additive polymer selected from the group consisting of polyhydroxystyrene, novolac resins, polyacrylic acid, polymethacrylic acid and copolymers of monomers for the polymers defined above.

17. A method according to claim 14, wherein the electrolytic polymerization in the first stage is effected while applying a potential for electrolytic polymerization between the external electrode and a counter electrode placed in the electrolytic polymerization solution, and the second stage electrolytic polymerization is effected by applying a potential between an anode of the capacitor and the counter electrode.

18. A method according to claim 14, wherein the electrolytic polymerization solutions in the first and second stages each comprises water as a solvent.

* * * * *